A. WARTH.

Machine for Cutting Textile and other Materials.

No. 5,186. Reissued Dec. 10, 1872.

Witnesses:
Ernst Bilhuber.
C. Wahlers.

Inventor:
Albin Warth
By Van Santvoord & Mauff
his attys

3 Sheets--Sheet 2.

A. WARTH.

Machine for Cutting Textile and other Materials.

No. 5,186. Reissued Dec. 10, 1872.

Witnesses:
Ernst Kilhuber.
C. Wahlen.

Inventor
Allin Warth
By Van Santvoord Hauff
his atty

A. WARTH.

Machine for Cutting Textile and other Materials.

No. 5,186. Reissued Dec. 10, 1872.

Witnesses:
Ernst Bilhuber.
C. Wahlers.

Inventor
Albin Warth
By Van Santvoord Merf.
his atty

UNITED STATES PATENT OFFICE.

ALBIN WARTH, OF STAPLETON, NEW YORK.

IMPROVEMENT IN MACHINES FOR CUTTING TEXTILE AND OTHER MATERIALS.

Specification forming part of Letters Patent No. 106,101, dated August 2, 1870; reissue No. 5,004, dated July 23, 1872; reissue No. 5,186, dated December 10, 1872.

*To all whom it may concern:*

Be it known that I, ALBIN WARTH, of Stapleton, in the county of Richmond and State of New York, have invented a new and useful Improvement in Machines for Cutting Textile and other Materials; and I do hereby declare the following to be a full, clear, and exact description thereof, which will enable those skilled in the art to make and use the same, reference being had to the accompanying drawing forming part of this specification, in which drawing—

Figure 1:
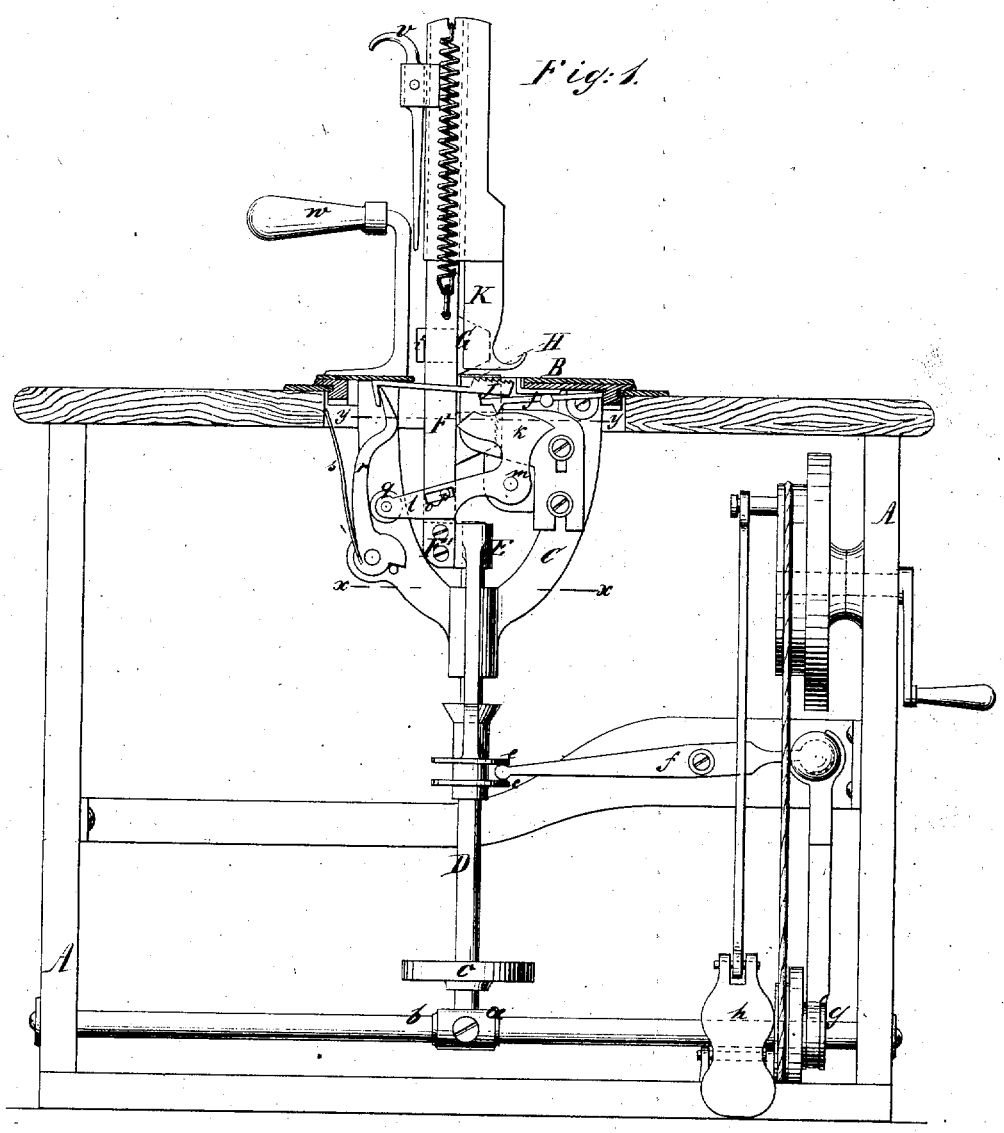
Figure 2:
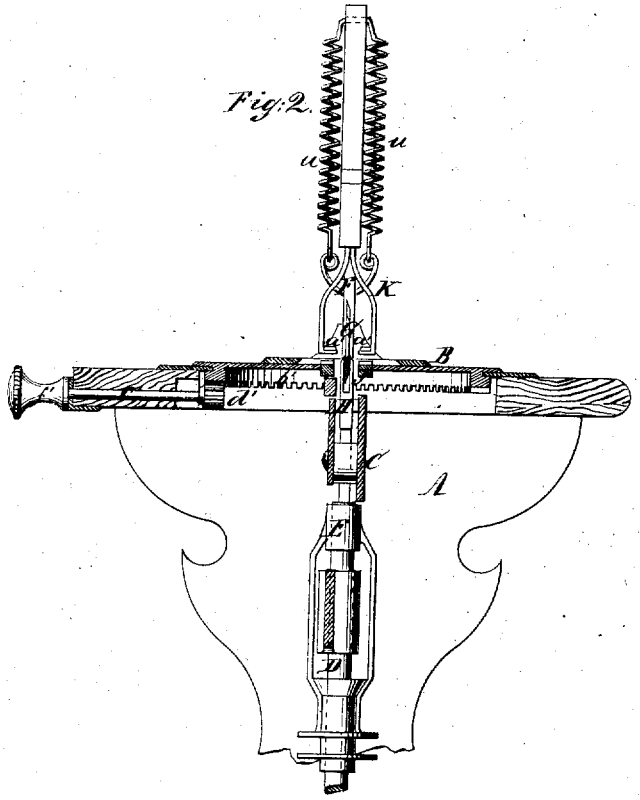
Figure 2:
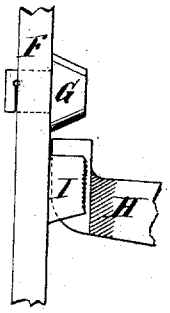
Figure 3:
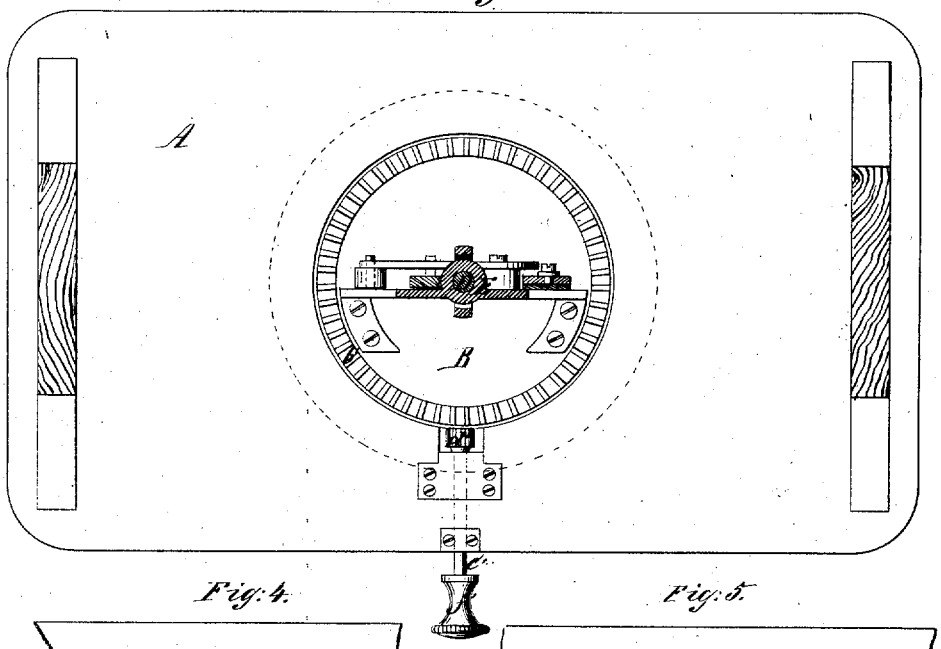
Figure 4:
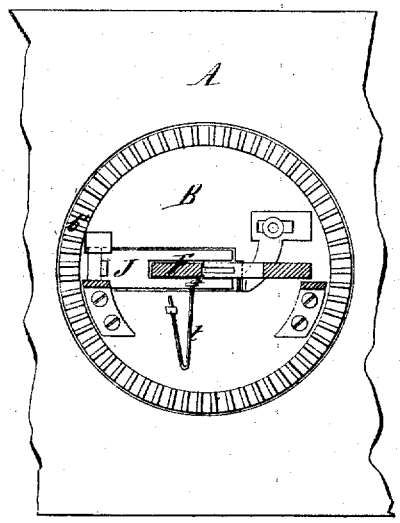
Figure 5:
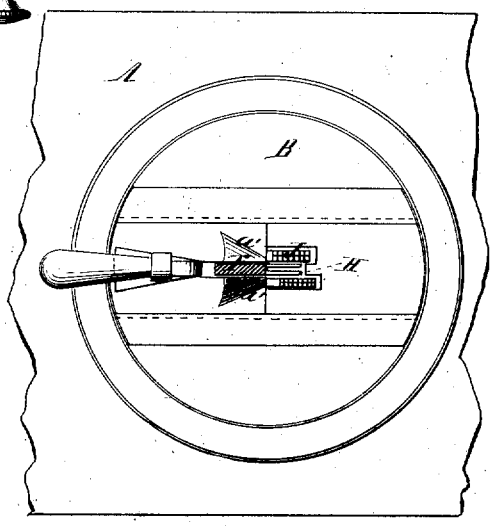
Figure 6:
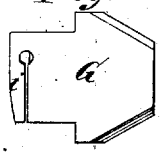
Figure 7:
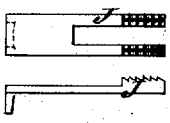

Figure 1 represents a sectional front view of my invention; Fig. 2 is a transverse section of the same; Fig. 2* is a side view of the cutter-bar with the cutter and cleaner operating in the knife-receiving socket; Fig. 3 is an inverted sectional plan of the same, the line *x x*, Fig. 1, indicating the plane of section; Fig. 4 is a similar view of the same in the plane *y y*, Fig. 1; Fig. 5 is a sectional plan or top view of the same; Fig. 6 is a detached view of the cutter; and Fig. 7 is a detached plan and side elevation of the feed-dog.

Similar letters indicate corresponding parts.

This invention relates to a machine intended for cutting cloth, muslin, paper, leather, or other materials used in the manufacture of garments or shoes, said machine being principally constructed of a knife or cutter which works in a knife-receiving socket, one or both edges of which form cutting-edges, the knife being situated above the material to be cut, while the knife-receiving socket is situated beneath said material, and forms the support, or part of the support, of the same, the knife and socket being connected to a common rod or shaft in such a manner that when the knife is turned the socket will follow, and that by the co-operation of the cutting-edges of the knife and of the socket the operation of cutting patterns of straight, curved, or irregular lines, is effected with ease and facility. The knife or cutting-blade is secured to an arm extending at right angles from the driving sleeve or rod, the connection being made in such a manner that the said knife-carrying arm can be swiveled round the driving-shaft without being thrown out of gear with the same. With the knife and the knife-receiving socket, and the parts connecting the same, is combined an automatic-feed mechanism in such a manner that when the knife and socket are turned to follow the sinuosities of the pattern the feed mechanism partakes of this motion, and the knife can be readily made to follow a rectilinear or curved path. With the feed mechanism is combined a presser-foot, which slides on the rod that carries the knife, and is provided with a stop-lever, by means of which it can be locked in an elevated position. The knife is stamped out of sheet metal with a double cutting-edge, and with a locking-spring formed at its rear edge, so that, when said knife is passed through the mortise in the rod intended to receive the same, the locking-spring catches over the rear edge of said rod and retains the knife. The entire cutting mechanism is supported by a platform or head, which can be swiveled round in either direction by means of a hand or foot lever, or by a circular rack and pinion, which can be operated from a distance. From the parts which form the connection between the knife and the knife-receiving socket extends a handle, the support of which follows the knife, so that the position of the knife and the knife-receiving socket can be accommodated to the formation of the pattern independent of the size or extent of the material from which the pattern is to be cut out. With the parts which form the connections between the knife-receiving socket and the knife are combined two spreading-fingers, one on each side of the knife, to prevent the material, after the same has been cut out, from crowding the knife. With the knife and the knife-receiving socket is combined a clearing-blade for the purpose of keeping the socket clear from fibers and other impurities.

In the example represented by the drawing, the letter A designates a table, made of wood or other suitable material, and of any desirable form or size. On this table is placed a circular platform or head, B, from the bottom surface of which extends a hanger, C, carrying a rod, D, that is stepped in a bearing, *a*, secured to a rod, *b*, which is fastened between the legs of the table A. The rod D is firmly secured to the hanger C, and on its lower part is mounted a foot-piece, *c*, so that the operator can turn the hanger and the platform in either direction by the action of his foot, the platform B being fitted in the table A, so that it can be readily swiveled round its own center. The rod D forms a guide for the sleeve E, from the top part of which extends an arm, F′, carrying a flat bar, F, to which the knife G is attached, while on the bottom part of said sleeve are secured two flanges, *e e*, which straddle the end of a lever, *f*, to which an oscillating motion is imparted by an eccentric, *g*, or by any other suitable mechanism. The arm F′ extends from the sleeve in such a manner that the knife-carrying bar F on being swiveled round describes a circle round the rod D, and at the same time the flanges *e e* always remain in gear with the driving mechanism. As the lever *f* oscillates it imparts to the sleeve E and bar F a reciprocating rising-and-falling motion. The eccentric *g* revolves on the rod *d*, motion being imparted to it by hand, foot, or any other power. If foot-power is used I employ a treadle, *h*, which is hung at or near the center of its length, so that motion can be imparted to it in one direction by depressing the toes of the foot and in the other direction by depressing the heel. The knife G is stamped out of sheet metal, in the form shown in Fig. 6. It presents a double cutting-edge, and on its back is formed a spring-catch, *i*, so that, when the shank of the knife is pushed through the mortise in the bar F said spring will catch over the rear edge of the bar and retain the knife firmly in position. As the knife descends it enters a socket, H, which is firmly secured to the hanger C, and the top of which presents a double cutting-edge, either of which is brought in operation according to the position of the knife. The material to be cut, on being fed under the knife, rests upon the top of the socket, and as the knife descends the material is cut by the action of the cutting-edge of the knife against the cutting-edge of the socket. In the socket works the clearer I, which is firmly secured to the bar F and passes into the socket from below, (see Fig. 2*.) By the action of this clearer all fibers and small particles which are liable to become disengaged from the material to be cut during the operation of cutting, are pushed out of the socket and thereby the socket is prevented from becoming chocked. The action of the clearer is improved by making its edge serrated. The material to be cut is fed to the knife by the action of a feed-dog, J, detached views of which are shown in Fig. 7. This feed-dog straddles the knife-supporting bar F, and its serrated front end is supported by a lever, *j*, (Fig. 1,) which is pivoted at one end to the hanger C, while its loose end bears upon the cam-shaped end *k* of a bell-crank lever, *k l*. This bell-crank lever has its fulcrum on a pivot, *m*, secured in a bracket attached to the hanger C, and its arm *l* is provided with a slot, *o*, which straddles a pin, *p*, secured in the bar F. In the end of the arm *l* is secured a friction-roller, *q*, that bears against the edge of a lever, *r*, said lever being pressed up against the friction-roller by a spring, *s*, (see Fig. 1.) The upper end of the lever *r* supports the hook-shaped tail-end of the feed-dog J, and said lever is curved, so that when the friction-roller rises it imparts to the lever *r* an oscillating motion, and thereby the feed-dog is carried forward toward the knife G; but before this forward motion of the feed-dog takes place the cam-shaped end of the arm *k* of the elbow-lever causes the lever *j*, and with it the feed-dog J, to rise, so that the teeth of said feed-dog will take hold of the material to be cut and be in position to carry said material along when the forward motion of the feed-dog takes place. A spring, *t*, (see Fig. 4,) which acts on the feed-dog, serves the double purpose of keeping the serrated end of the same down upon the lever *j*, and of pressing the hook-shaped end of said feed-dog up against the lever *r*. When the bar F rises, therefore, the feed-dog is first caused to take hold of the material, and then it receives the forward motion, thereby carrying the material under the knife, and when the bar F descends the feed-dog is caused to drop, and then to recede ready for a new move. The bar F extends a certain distance beyond the mortise intended to receive the knife, and the upper end of said bar forms the guide for the tubular shank of the presser-foot K. This presser-foot straddles the knife, and it is depressed by the action of two springs, *u u*, one on each side, so as to produce a uniform action. These springs are hitched at their bottom ends to a wire passing through or fastened in the bar F, and their upper ends catch over the top edge of the tubular shank of the presser-foot. By the action of the presser-foot the material to be cut is kept down upon the platform during the time the cutting takes place, and at the moment the feed motion takes place the presser-foot is raised sufficiently to allow the material to be fed without obstruction. The presser-foot can be raised by means of a handle, *v*, which is hinged to its shank, and which also acts as a stop to retain the foot in its elevated position. For this purpose it is brought to bear upon the edge of a handle, *w*, the support of which rises from the platform or head B just behind the knife-supporting bar, said handle serving to turn the knife together with the knife-receiving socket in either direction, as the pattern to be cut may demand. The support of the handle *w* is thicker than the knife-supporting bar, and as said support follows the knife into the cut the material already cut is spread by said support and prevented from crowding against the sides of the knife-supporting bar or of the knife.

It will be readily seen that, in order to obtain a handle above the material to be cut, the support of said handle must extend up through the cut opened by the knife in the material, and by placing the handle in this position in relation to the knife the workman is enabled to guide the knife with ease and facility, and at the same time the great advantage is gained that, by the support of the handle itself, the material already cut is prevented from crowding the knife or the knife-supporting bar, as above stated.

From the head B rise two mold-board-like flanges, *a'*, one on each side of the knife-supporting bar F, and close to the same. These flanges serve also to prevent the cut material from crowding against the knife or the knife-supporting bar. The head B is provided at its under surface with a circular rack, *b'*, (see Figs. 2, 3, and 4,) and through the edge of the table extends a rod, *c'*, which carries at its inner end a pinion, *d'*, and at its outer end a handle, *f'*. By pushing in this rod the pinion *d'* is thrown in gear with the rack *b'*, and the head B can be rotated by turning the handle *f'*. This mechanism may be substituted for the handle *w*; but in practice I prefer to use the handle *w* secured to a support which rises from the head B.

The material to be cut is adjusted on the head B under the presser-foot, and by imparting to the knife the required motion the operation of cutting is effected.

If the knife is to follow a curved path and the piece to be cut is small the head may remain stationary, and the material can be turned, as required; but if the piece from which a certain pattern is to be cut out is large, and cannot be conveniently turned, then I turn the head B, causing the knife to follow the outlines of the pattern previously marked on the material, and in turning the knife the knife-receiving socket is also turned, so that those parts always preserve their relative position toward each other.

This is a very essential feature of my machine, for, if the knife and the knife-receiving socket were not so connected, the operation of cutting out irregular patterns from large pieces of material by the aid of this machine would be exceedingly difficult, if not entirely impossible. In order to accomplish this result, it is essential that the standard to which the handle *w* is attached is so situated that the same passes through the cut opened by the knife. If this standard does not pass through the cut opened by the knife, the material cannot be freely moved under the knife in every direction, and the machine can only be used for cutting out patterns from comparatively small pieces of cloth or other material, but by placing said standard in such a position that it passes through the cut opened by the knife, I am enabled to cut out patterns from pieces of cloth or other material of any desired size, and for this reason my machine is particularly valuable for large clothing-houses, where the patterns are drawn in succession on whole pieces of cloth or other material and then cut out by carrying said pieces through under my cutting mechanism.

My machine is principally intended for large clothing manufacturers, and it is capable of cutting at one operation through twenty or more thicknesses of cloth or other textile fabrics, or through a large number of thicknesses of paper, and also through several thicknesses of leather.

The manipulation of the machine is quite simple, and its operation is exceedingly rapid, so that it produces a great saving in hand labor.

It must be remarked that, for different kinds of work the knife may be changed; it may, for instance, be made to act as a punch or button-hole cutter, or as a cutter of any other description, but in all cases, whatever the form or construction of the knife may be, the knife-receiving socket must be connected with the knife so that these two parts will preserve their relative position toward each other in whatever direction the knife may be turned.

What I claim as new, and desire to secure by Letters Patent, is—

1. The arrangement of the knife or cutting blade on an arm, which extends at right angles from the sleeve or rod, by means of which motion is imparted to the knife, the connection between said sleeve or rod and the driving mechanism being such that the knife-carrying arm can be swiveled round in either direction without being thrown out of gear with the driving mechanism, substantially as set forth.

2. The combination of an automatic feed apparatus with a knife and with a knife-receiving socket, when said parts are connected so that they preserve their relative position toward each other in whatever position the knife may be turned, substantially as set forth.

3. The presser-foot, arranged to slide on the knife-supporting bar, provided with a suitable tension-spring, substantially as and for the purpose described.

4. The handle *w*, secured to a support which rises from the parts connecting the knife and the knife-receiving socket, said support being so situated that it passes through the cut opened by the knife, substantially as set forth.

5. The knife G, provided at its rear edge with a spring-catch, substantially as set forth.

6. The head or platform B, capable of being turned in either direction and carrying with it the knife and knife-receiving socket, substantially as described.

7. The rotating head B, carrying the feeding and cutting mechanism and their operating parts, substantially as and for the purpose set forth.

8. The combination of the knife having two cutting-edges with a socket having cutting-edges, either of which is brought in operation according to the position of the knife, substantially as and for the purpose described.

9. The arrangement of a clearing-blade attached to the knife-supporting bar and serving to clear the socket H, substantially as described.

10. The bell-crank lever *k l* and levers *j* and *r*, in combination with the knife-supporting bar and with a feed-dog, substantially as described.

11. The stationary mold-board-shaped flanges *a′ a′*, embracing the sides of the knife-supporting bar, for throwing off the cut material, substantially as set forth.

This specification signed by me this 14th day of October, 1872.

ALBIN WARTH.

Witnesses:
W. HAUFF,
E. F. KASTENHUBER.